July 29, 1952     C. B. STADUM     2,605,305
ELECTRONIC SEQUENCE TIMER
Filed July 1, 1949
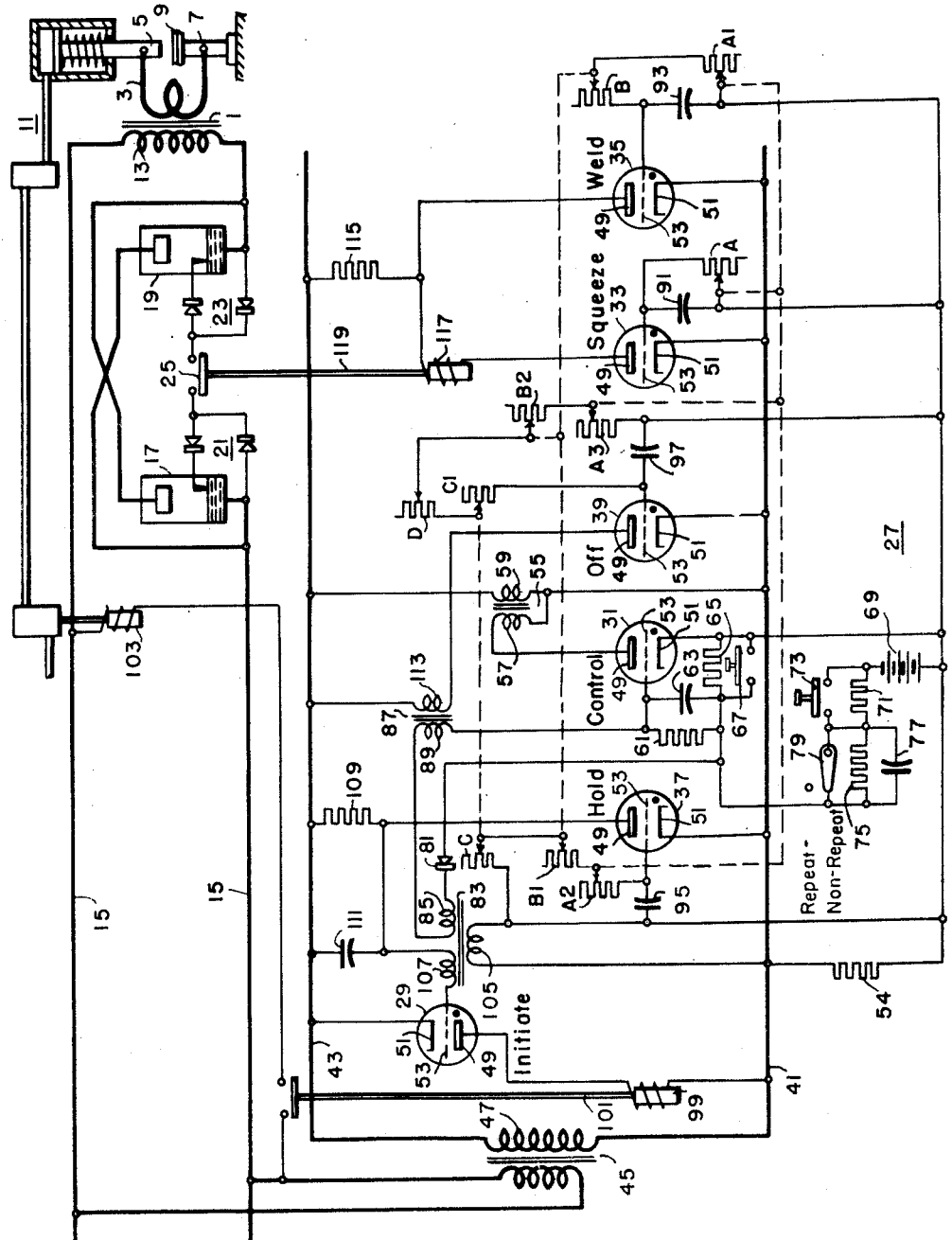
WITNESSES:
INVENTOR
Clarence B. Stadum.
BY
ATTORNEY Patented July 29, 1952

2,605,305

UNITED STATES PATENT OFFICE 2,605,305

ELECTRONIC SEQUENCE TIMER

Clarence B. Stadum, Buffalo, N. Y., assignor to Westinghouse Electric Corporation, East Pittsburgh, Pa., a corporation of Pennsylvania Application July 1, 1949, Serial No. 102,508

8 Claims. (Cl. 171—97)

My invention relates to electric discharge apparatus and it has particular relation to apparatus for timing a succession of events, each of which is to persist for a predetermined time interval.

My invention has particular application to resistance welding. A resistance welding operation is initiated by the closing of a start switch. After the switch is closed the electrodes are engaged with the work under pressure. This event takes place during a time interval of proper length called the Squeeze interval. Following the Squeeze interval, the flow of welding current takes place during an interval which is called the Weld interval. When the flow of welding current is interrupted, the welding electrodes are maintained in engagement with the material during a so-called Hold interval until the weld hardens. The electrodes are then disengaged from the material and maintained in disengagement during a so-called Off interval so that the material may be reset for a second operation. If the welder is set for Repeat operation and the start switch is maintained closed, the above-described sequence of events is repeated a number of times and a series of welds are produced. If the welder is set for Non-repeat operation, the start switch must be reopened and reclosed after the completion of each Hold interval.

Each of the events of a welding or similar operation must occur promptly and precisely in its turn and its duration must be maintained within narrow limits. If, for example, the Weld interval is initiated before the Squeeze interval is completed, the material to be welded is burned by the premature discharge between the electrodes. If the Weld interval is too long, the material may be burned; if it is too short, a secure joint may not be affected. If the Hold interval is terminated prematurely, the welding electrodes in opening draw the soft welded buttons with them and punch a hole in the material. If the Off interval is terminated prematurely or too late, the welds may be too closely or too remotely spaced. The failure of a timer during one of a series of operations may have serious consequences. For example, because the metal is burned or perforated at one weld, a sheet, which has been fabricated for use as a fender or as one side of an automobile, may be so seriously damaged as to be scrapped.

Sequence timers constructed in accordance with the teachings of the prior art in wide use, include a plurality of electric discharge circuits for timing the various events and a plurality of electromagnetic relays actuable by the flow of current through the discharge circuits for producing the desired succession in the actuation of these circuits. These relays are actuated by the current flow through thyratrons. For economy reasons the thyratrons are of low current carrying capacity and the sequence relays are relatively light. The operation of each electromagnetic relay consumes an appreciable time interval. These intervals for the different relays are interposed between each event and the succeeding event, and the speed of operation of a welding system is limited by it. A welder is essentially a machine tool designed for carrying out many operations. The relays in the prior art sequence timer are operated many times and are subjected to unusual wear and tear. Since they are of light construction, the relays soon wear out. In fact, the life of an electromagnetic sequence timer is to a large extent limited by the life of the electromagnetic relay available for sequence timer service.

It is accordingly an object of my invention to provide a timer devoid of sequencing electromagnetic relays for timing precisely the duration and the sequence of a plurality of events.

A more specific object of my invention is to provide a sequence timer devoid of sequencing electromagnetic relays for a welder.

Another specific object of my invention is to provide a purely electronic sequence timer.

A further object of my invention is to provide a welding system including a purely electronic welding contractor cooperatively associated with a purely electronic sequence timer.

Another object of my invention is to provide a purely electronic sequence timer for a welder, which is simple in design and operation.

An ancilliary object of my invention is to provide novel electric discharge device circuits, particularly adapted to contribute to reliable sequence timing by purely electronic means.

My invention is based on the broad concept of initiating each of the various functions (Squeeze, Weld, Hold and Off) by rendering conductive in the proper sequence, an initially non-conductive electric discharge valve (or rendering non-conductive in the same sequence an initially conductive valve). To accomplish this broad objective I provide a system including a single valve for each of the functions. In the control circuit of each valve a time constant network including a timing energy storage device is provided. To simplify the structure and operation of the system, all storage devices are charged simultaneously from a common source and all begin to discharge simultaneously at the beginning of a complete timing sequence operation.

One of the specific features of my invention arises from the realization that if the discharge time in any one of the networks is reset, the total time for a complete operation must be changed, and the discharge time in the other networks must be correspondingly reset.

In accordance with a specific aspect of my invention, the discharge time is determined by a component, preferably a variable resistor, through which the energy storage device is discharged. The time interval of any function is varied by varying this resistance. The correction of the total time period is effected by simultaneously varying auxiliary resistances in the networks of the functions which follow the varied function by the same increment as the resistance timing the varied function is varied. By this expedient the time intervals of a particular function can be varied without affecting the time interval of any other function. If the Squeeze time is increased, for example, the initiation of the Weld, Hold and Off intervals is delayed by a time interval equal to the increase, but the duration of the latter intervals remains unchanged.

The novel features that I consider characteristic of my invention are set forth with particularity in the appended claims. The invention itself, however, both as to its organization and method of operation, together with additional objects and advantages thereof, will best be understood from the following description of a specific embodiment when read in connection with the attached drawing, which is a schematic diagram showing a preferred embodiment of my invention.

The apparatus shown in the drawing comprises a welding transformer 1 across the secondary 3 of which welding electrodes 5 and 7 are connected. One of these electrodes 5 may be moved into and out of engagement with the work 9 by operation of a hydraulic system 11. Power is supplied to the primary 13 of the transformer 1 from buses 15, which may be the buses of a commercial supply of 200 to 2300 nominal voltage rating, through a pair of ignitrons 17 and 19 reversely connected in parallel between one of the buses 15 and the primary 13. Firing circuits 21 and 23 respectively are provided for the ignitrons. These circuits are normally open but may be closed by the operation of a contactor 25.

The operation of the welding electrodes 5 and 7 and the supply of welding current are controlled from a sequence timer 27 devoid of sequencing electromagnetic relays. This timer determines the duration and the order of occurrence of the Squeeze, Weld, Hold and Off intervals. It includes electric discharge devices 29, 31, 33, 35, 37, 39 for Initiate, Control, Squeeze, Weld, Hold, and Off functions, respectively. These electric discharge devices are supplied from auxiliary buses 41, 43 which are energized from the secondary 47 of a transformer 45 which is in turn energized from the main buses 15. The electric discharge devices may be of any suitable type, for example WL2050, having an anode, a cathode and a control element but are preferably thyratrons.

The electric discharge device 31 which I shall call the control tube, has its cathode 51 connected through a charging resistor 54 to the first auxiliary bus 41, and its anode 49 connected in series with the secondary winding 57 of a first transformer 55, to the first auxiliary bus 41. The primary winding 59 of the first transformer 55 is connected across the auxiliary buses 41, 43. Grid bias for the control tube 31 is obtained through various combinations of three circuits. The first circuit may be traced from the grid 53 of the control tube through a paralleled resistor 61 and capacitor 63 which is in series with paralleled resistor 65 and momentary contact type switch 67, to the cathode 51. The second circuit may be traced from the cathode side of the switch 67 through a battery 69, positive to negative, through a resistor 71 which is shunted by the momentary contact type foot switch 73, through the parallel combination of a resistor 75 and capacitor 77 which is shunted by a switch 79 when the apparatus is on non-repeat operation, to the grid side of the switch 67. The third circuit may be traced from the grid side of the switch 67, through a dry rectifier 81, one of the secondary windings 85 of a three winding transformer 83, and the secondary winding 89 of a second transformer 87 to the grid. In the preferred practice of my invention, I use time constant networks which comprise a capacitor and a resistor connected in parallel because of the simplicity and ready availability of their components. Systems, including time constant networks composed of inductors and resistors or of combinations of inductors, capacitors and resistors, are within the scope of my invention.

The time constant networks of the Squeeze, Weld, Hold and Off tubes, each include a control or "true time" potentiometer, which I shall designate A, B, C and D, respectively. Each succeeding network of the timing sequence also includes duplicates of all the potentiometers of the preceding network, connected in series with its "true time" potentiometer. Thus, the Squeeze network contains potentiometer A, the Weld network includes potentiometers A1 and B, the Hold network includes potentiometers A2, B1 and C, and the Off network includes potentiometers A3, B2, C1 and D. The time constant network of a particular sequence comprises its potentiometers in parallel with a capacitor 91, 93, 95, 97, respectively. The Squeeze, Weld, Hold and Off time constant networks are connected in the grid, cathode circuits of their respective tubes, and in parallel across a charging resistor 54. This charging resistor is connected in the anode circuit of the control tube 31, between its cathode 51 and the first auxiliary bus 41. The function of the charging resistor 54 is to charge the time constant network capacitors in parallel by grid rectification in a sense to prevent conduction of the associated tubes. The charging resistor 54 is energized by conduction of the control tube 31. When the Control tube becomes non-conductive, then all of the parallel networks begin timing out simultaneously. Duplicate potentiometers in the parallel time constant networks are ganged. As a result of this ganging, the "true time" potentiometer can be varied to change the actual time interval of a particular sequence without effecting the actual or "true time" interval of any other sequence.

The cathode 51 of the initiating tube 29 is connected to the second auxiliary bus 43. The anode 49 is connected through the energizing coil 99 of the welder head relay 101 to the first auxiliary bus 43. The welding head relay 101 when energized, closes the energizing circuit of a solenoid valve 103 which is connected across the main supply buses 15. This solenoid valve 103 controls the hydraulic circuit 11 to lower the welding head 5.

The primary winding 105 of the three winding transformer 83 is connected across the charging resistor 54. The other secondary winding 107 of the three winding transformer 83 is connected from the grid 53 of the Initiate tube 29 to the anode 51 of the Hold tube 37 and also through a parallel resistor 109 and capacitor 111 to the second auxiliary bus 43. The anode 49 of the Off tube 39 is connected through the primary winding 113 of the second transformer 87 to the second auxiliary bus 43. The anode 49 of the Weld tube 35 is connected through the coil 117 of the ignitron firing control relay 119 to the anode 49 of the Squeeze tube 33.

Preparatory to starting the welding operation, the main power supply buses 15 are energized, which energizes the auxiliary buses 41, 43 to apply anode voltage to all of the electric discharge devices in the sequence timer circuit 27. Assuming that the repeat, non-repeat switch 79 is closed for repeat operation, the bias furnished by the battery 69 across the resistor 71 which is in parallel with the foot switch 73 in the grid circuit of the Control tube 31 is 30 volts negative, which will prevent the Control tube 31 from conducting. The switch 67 is then operated to momentarily shunt its associated resistor 65 and the 30 volts negative bias contributed by the battery 69, whereupon the Control tube 31 conducts. Current flowing in the anode circuit of the Control tube 31 energizes the primary winding 105 of the three winding transformer 83, and the charging resistor 54. Current supplied by the secondary winding 85 of the three winding transformer 83 in the grid circuit of the Control tube 31 is rectified so that a bias of 40 volts positive is supplied to the grid 53 of that tube. The resultant grid bias on the Control tube 31 is 10 volts positive when the contacts of the switch 67 are opened to return 30 volts negative bias. Thus the Control tube 31, upon conducting, locks itself in the conducting state.

The other secondary winding 107 of the three winding transformer 83 produces a voltage in the grid circuit of the Initiate tube 29 which is phased to be negative when the anode voltage of the Initiate tube is positive. As a result, the capacitor 111 in the grid circuit of that tube is charged by grid rectification to produce a negative bias which prevents conduction.

The voltage across the charging resistor 54, by grid rectification of the Squeeze, Weld, Hold and Off tubes, charges the capacitors in the time constant networks associated with those tubes, creating negative bias to prevent conduction.

The operation of the welding sequence is started by closing the foot switch 73, shunting its associated resistance 71 to increase the negative bias supplied by the battery 69 to 50 volts. The resultant grid bias on the Control tube 31 is now negative, so conduction of that tube ceases. The Control tube is now locked out, so that the sequence timer is non-beat. There being no voltage on the charging resistor 54, the capacitors 91, 93, 95, 97 in the time constant networks of the Squeeze, Weld, Hold and Off tubes begin to discharge, and thus simultaneously start their timing out function.

The charging voltage supplied to the grid circuit capacitor 111 of the Initiate tube 29 by the three winding transformers 83 having been removed, that capacitor begins to discharge through its associated resistor 109. When the negative bias on the grid of the Initiate tube 29 has diminished to a critical magnitude, that tube conducts. Conduction of the Initiate tube 29 energizes the welding head relay 101 which closes to energize the solenoid valve 103 to admit hydraulic pressure on the welding head 5, which moves down to clamp the workpiece 9.

When the Squeeze time has expired, the Squeeze tube 33 conducts to energize the ignitron firing circuit relay 119, and the ignitrons 17, 19 fire in a manner well known to those skilled in the art, to supply welding current to the load.

At the end of the Weld time, the Weld tube 35 conducts, shunting the ignitron firing circuit relay 119 so that it drops out, and the ignitrons 17, 19 cease firing.

The Hold tube 37 conducts upon expiration of the Hold time, creating a voltage across the resistor 109 in the grid circuit of the Initiate tube 29. This voltage negatively charges the capacitor 111 which is associated with the said resistor 109 by grid rectification. The negative bias on the grid of the Initiate tube 29 terminates its conduction so that the welding head relay 101 is deenergized to raise the welding head 5.

Upon expiration of the Off time, the Off tube 39 conducts to energize the primary 113 of the transformer 87 in its anode circuit. The secondary 89 of this transformer contributes sufficient voltage to charge the grid circuit capacitor 63 of the Control tube 31 to 60 volts positive in approximately one cycle. The resultant grid bias on the Control tube is now 10 volts positive, so the Control tube again conducts, and in approximately one cycle, the time constant network capacitors regain their negative charges to stop their associated tubes from conducting.

The transformer 87 in the anode circuit of the Off time tube 39 is deenergized when that tube ceases to conduct. The 60 volts positive bias contributed by that transformer in the grid circuit of the Control tube 31 is removed, so the negative bias contributed by the battery 69 again controls, and the tube 31 ceases to conduct. Cessation of conduction of the Control tube removes the voltage on the charging resistor 54, and the entire welding sequence repeats in the same manner as has been previously described, for as long as the foot switch 73 is closed.

If the foot switch 73 is open at the end of the Off time, then the negative bias contributed by the battery 69 is only 30 volts, making the resultant bias zero volts. With a bias of zero volts, the Control tube 31 continues to conduct and the sequence is not repeated.

For non-repeat operation, the repeat, non-repeat switch 79 is open. In this condition, the battery contributes 20 volts negative bias. Then at the end of the Off time, if the foot switch 73 is open, there is only 20 volts negative bias opposed to the 40 volts positive bias contributed by the transformer winding 105 in the anode circuit of the control tube. The resultant bias is positive so the Control tube 31 continues to conduct and the sequence does not repeat. When the foot switch 73 is closed, there is a transient negative bias of 50 volts in the battery circuit. This bias is sufficient to render the Control tube 31 non-conductive, so that a welding sequence follows. If the foot switch 73 is closed when the Off time expires, the battery circuit contributes 30 volts negative bias, which is not sufficient to cause the Control tube 31 to cease conducting, so the sequence does not repeat.

Although I have shown and described certain specific embodiments of my invention, I am fully aware that many modifications thereof are possible. My invention therefore is not to be restricted except insofar as is necessitated by the prior art and by the spirit of the appended claims.

I claim as my invention:

1. In combination, a plurality of time constant networks, each comprising an energy storage component and a component for discharging said energy storage component, connections for initiating the timing operation of said time constant networks, said time constant networks being characterized by the fact that each of said components for discharging said energy storage components comprises impedances duplicating the impedances of the component for discharging said energy storage component of the preceding time constant network plus an additional impedance, and all of said duplicate components for discharging said energy storage components being mechanically connected in tandem.

2. In combination, a first time constant network comprising a capacitor and a first potentiometer, a second time constant network comprising a capacitor and a duplicate of said first potentiometer and a second potentiometer, a third time constant network comprising a capacitor and duplicates of said first and second potentiometers plus a third potentiometer, a fourth time constant network comprising a capacitor and duplicates of said first, second, and third potentiometers and a fourth potentiometer, means for connecting all of said duplicate potentiometers in tandem, and connections for coordinating the operation of said time contant networks to time a series of events.

3. A device for timing a series of events, including a plurality of electrical time constant networks, means for starting the timing action of said networks simultaneously from a zero time, each of said time constant networks being independently adjustable to a time equal to the interval from zero time to the desired actuating time for its associated event.

4. In combination, a plurality of time constant networks, each comprising an energy storage component and a component for discharging said energy storage component, said discharge components being different for said different networks so that said networks complete their discharge function in a predetermined sequence, and connections for initiating simultaneously, the timing operation of said time constant networks, said networks which complete the discharge function after the first network completes its discharge function, being characterized by the fact that each of said components for discharging said energy storage components comprises impedances duplicating the impedances of the component for discharging said energy storage component of the preceding time constant network plus an additional impedance.

5. A device for timing a series of events, including a plurality of electrical time constant networks, each comprising a reactive component and at least one non-reactive component, the non-reactive components of a succeeding stage comprising a duplicate of each non-reactive component of a preceding stage plus another non-reactive component, means for ganging said duplicate non-reactive components, means for starting the timing action of said networks simultaneously from a zero time, each of said networks being independently adjustable to a time equal to the interval from zero time to the desired actuating time for its associated event.

6. A device for timing a series of events, including a plurality of time constant networks each comprising a capacitor and at least one potentiometer, each succeeding time constant network including a duplicate of each of the potentiometers of the preceding time constant network and an additional potentiometer means for ganging the duplicate potentiometer, means for starting the timing action of said networks simultaneously from a zero time, each of said networks being independently adjustable to a time equal to the interval from zero time to the desired actuating time for its associated event.

7. A welding sequence timer for timing at least Squeeze, Weld, Hold, and Off, functions of a welding apparatus, a network for determining Squeeze time apparatus, a network for determining Squeeze time comprising a capacitor in series with a first potentiometer, a network for determining weld time comprising a capacitor in series with a first potentiometer, a network for determining Weld time comprising a capacitor in series with a duplicate of said first potentiometer and a second potentiometer, a network for determining Hold time, comprising a capacitor in series with duplicates of said first and second potentiometers and a third potentiometer, a network for determining Off time, comprising a capacitor in series with duplicates of said first, second, and third potentiometers and a fourth potentiometer, means for ganging each set of duplicate potentiometers, means for starting the timing action of said networks simultaneously from a zero time, each of said networks being independently adjustable to a time equal to the interval from zero time to the desired actuating time for its associated event.

8. Apparatus for timing a sequence of events including an electric discharge valve for timing each event, a time constant network including an energy storage component and a component for discharging said storage component connected to each valve for controlling the conductivity of said valve, and a unitary component adapted to be energized for charging said storage components simultaneously, said unitary component when deenergized permitting said storage components to start discharging simultaneously.

CLARENCE B. STADUM.

REFERENCES CITED

The following references are of record in the file of this patent:

UNITED STATES PATENTS

| Number | Name | Date |
|---|---|---|
| 2,359,142 | Murcek | Sept. 26, 1944 |
| 2,422,020 | Kingsmill | June 10, 1947 |